United States Patent [19]
Spencer

[11] Patent Number: 5,130,166
[45] Date of Patent: Jul. 14, 1992

[54] METHOD FOR REDUCING THE PORE SIZE OF SINTERED METAL FILTERS BY APPLICATION OF AN ALCOHOLIC SOLUTION OF A METAL ALKOXIDE WHICH IS CONVERTED TO AN INSOLUBLE HYDROUS METAL OXIDE

[75] Inventor: Harold G. Spencer, Clemson, S.C.

[73] Assignee: E. I. Du Pont de Nemours and Company, Wilmington, Del.

[21] Appl. No.: 629,663

[22] Filed: Dec. 14, 1990

[51] Int. Cl.$^5$ ............................................. B05D 3/04
[52] U.S. Cl. ................................. 427/337; 427/340; 427/239; 427/377; 210/500.25
[58] Field of Search ............... 427/181, 189, 239, 384, 427/435, 337, 340, 377, 244; 210/500.25

[56] References Cited

U.S. PATENT DOCUMENTS

| | | | |
|---|---|---|---|
| 4,059,418 | 11/1977 | Cull | 55/73 |
| 4,318,944 | 3/1982 | Hall | 427/435 |
| 4,361,598 | 11/1982 | Yoldas | 427/106 |
| 4,647,479 | 3/1987 | Montes | 427/384 |
| 4,762,619 | 8/1988 | Gaddis et al. | 210/500.25 |
| 4,888,114 | 12/1989 | Gaddis et al. | 210/500.25 |
| 4,938,870 | 7/1990 | Butler et al. | 210/500.25 |
| 4,939,180 | 7/1990 | Hendy | 427/384 |
| 4,971,696 | 11/1990 | Abe et al. | 210/500.25 |
| 5,006,248 | 4/1991 | Anderson et al. | 210/500.25 |
| 5,059,366 | 10/1991 | Galaj et al. | 210/500.25 |

OTHER PUBLICATIONS

Burggraaf, et al., Solid State Ionics 32/33 771–782 (1989) Ceramic Manostructure Materials, Membranes and Composite Layers.
Clement, et al., Materials and Manufacturing Processes 5, 17–33 (1990) Interfacial Modification in Metal Matrix Composites by the Sol–Gel Process.
Anderson, et al. Journal of Membrane Science, 39, 243–258 (1988) Titania and Alumina Ceramic Membranes.
Gieselmann, et al., Separation Science and Technology, 23, 1695–1714 (1988).
Physico–Chemical Properties of Supported and Unsupported $\gamma$-Al$_2$O$_3$ and TiO$_2$ Ceramic Membranes Moosemiller et al., Separation Science and Technology, 24, 641–657 (1989).
Physiochemical Properties of Supported $\gamma$-Al$_2$O$_3$ and TiO$_2$ Ceramic Membranes Anderson et al, Annual Progress Report, Feb. 1986–Mar. 1987, prepared for U.S. D.O.E. by Univ. of Wisconsin under Contract DE–AS07–86ID12626.
Anderson et al., Annual Progress Report, Mar. 1987–May 1988 prepared for US D.O.E. by Univ. of Wisconsin under Contract No. DE–AS07–86ID12626.
Anderson et al, Annual Progress Report, May 1988–May 1989, prepared for U.S. D.O.E. by Univ. of Wisconsin under Contract No. DE–AS07–86ID12626.
Anderson et al, Annual Progress Report, May 1988–May 1989, prepared for U.S. D.O.E. by Univ. of Wisconsin under Contract No. DE–AS07–86ID12626.

*Primary Examiner*—Michael Lusignan
*Assistant Examiner*—Diana L. Dudash
*Attorney, Agent, or Firm*—Charles E. Krukiel

[57] ABSTRACT

The invention is a process for modifying pore size near the surface of porous materials. The surface is contacted with an alcohol solution of a metal alkoxide which forms a hydrous oxide insoluble in water, an amount of water insufficient to hydrolyze fully the metal alkoxide, and a mineral acid for a time sufficient for the solution to penetrate the surface region but not the bulk. This is followed by exposing to sufficient moisture to complete hydrolysis and then curing to stabilize the metal oxide in the pores near the surface.

10 Claims, 1 Drawing Sheet

METHOD FOR REDUCING THE PORE SIZE OF SINTERED METAL FILTERS BY APPLICATION OF AN ALCOHOLIC SOLUTION OF A METAL ALKOXIDE WHICH IS CONVERTED TO AN INSOLUBLE HYDROUS METAL OXIDE

FIELD OF INVENTION

The present invention relates to a method for reducing and controlling pore size of filters such as those made from sintered metal.

BACKGROUND

In filtration separations of materials, ranging from coarse particles to dissolved salts, from liquids, it has long been recognized that it is advantageous to configure the filter with pores on the feed side as small as necessary for the removal and with much larger pores over the rest of the filter thickness. Such a configuration, not only allows high production rates with minimal pressure drops, but also hinders plugging of the pores in the high-permeability substructure with extraneous materials in the feed.

With formed-in-place, or dynamically formed, membranes, there are further advantages from thin layers on the feed side. For many membrane-forming additives, there are optimal pore sizes, frequently in the order of tenths of a micrometer. Also, many applications would not require membranes if the pores on the feed side were smaller.

U.S. Pat. No. 4,888,114 teaches a method of fabricating a porous metal support with a fired layer of metal-oxide particulates on the surface of one side of the porous support. The result is the reduction of pore sizes at the surface from several micrometers to tenths of a micrometer. The sizes of the pores of this altered-substrate are in a much more favorable range for formation of membranes in place and are far better for certain biological and biochemical separations carried out on porous tubes without membranes. Altered substrates circumvented the disadvantages of modifying pore sizes by what might be called a formed-in-place approach, that is by circulating fine particulates through the tubes before or during the process of membrane formation. The main disadvantages overcome were the difficulties of pumping particulates, problems in getting a uniform coating of them, and instability of the coatings in some cases.

Although altered substrates are a tremendous advance over prior technology, simple methods allowing further reduction and control of pore sizes would be advantageous both for in-place formation of membranes and for separations using the bare tubes. The process of this invention provides a method for doing this.

Of interest in the present case are sol-gel processes that are widely used in formations of ceramics for various applications; such as for tubes, catalysts, and nuclear fuel elements. The objective of such processes is to form the particles that comprise ceramics. Hydrolysis and polycondensation reactions of homogeneous solutions of metal alkoxides eventually yield polymeric networks of metal oxides. Many reviews can be found of this field; a recent one is by Burggraaf, et al., *Solid State Ionics* 32/33, 771-782 (1989).

J. P. Clement, H. J. Rack, K. T. Wu, and H. G. Spencer, Materials and Manufacturing Processes, 5, 17-33 (1990) modified the sol-gel technology to a process for forming controlled thickness and crystalline films on structural substrates such as carbon fibers to increase wettability of the substrate by molten metal and decrease adverse interaction of the substrate with the metal. Hydrolysis is carried out in two steps, by providing a limited quantity of water for the first step. The hydrolysis is completed and the coating stabilized by the subsequent exposure to water vapor and thermal treatment. This work is covered in co-pending U.S. patent application Ser. No. 07/536,540, incorporated herein by reference, on which the present inventor is also an inventor.

Clement et al. teach dip-coating to form the initial film, and curing by heating in a carbon monoxide atmosphere at 700° C. Time for performing the steps was not important.

The time allowed here is important in the control of the product.

SUMMARY OF INVENTION

A dry altered-substrate, preferably in tubular form, is covered for a short time, preferably less than 5 minutes, with a solution of a sufficient amount of a partially polymerized metal alkoxide that will form an insoluble hydrous oxide through reaction with water in dry alcohol. The preferred metal alkoxide is titanium isopropoxide. The preferred dry alcohol is isopropyl alcohol. The partially polymerized metal alkoxide is prepared by adding a controlled amount of water and a mineral acid, preferably hydrochloric or nitric acid, to the alkoxide-alcohol sol. After the substrate is sufficiently exposed to the alkoxide-alcohol sol, the solution is then drained out, and sufficient water, preferably as moist air or moist nitrogen, is then passed through at ambient or moderate temperature, leaving, in the preferred case, a Ti(IV) oxide deposited on the substrate. The Ti(IV) oxide deposited is then stabilized by heating at a sufficient time and temperature to substantially convert the coating to a crystalline state. Preferred temperatures are about 400° C. to 450° C. and times are about 30 to 60 minutes. The procedure may be repeated to further reduce the permeability.

FIGURE

FIG. 1 compares rejection and permeability of an altered substrate and a TIP treated altered substrate on which a calcium alginate membrane had been formed.

DETAILED DESCRIPTION OF INVENTION

Figure 1:
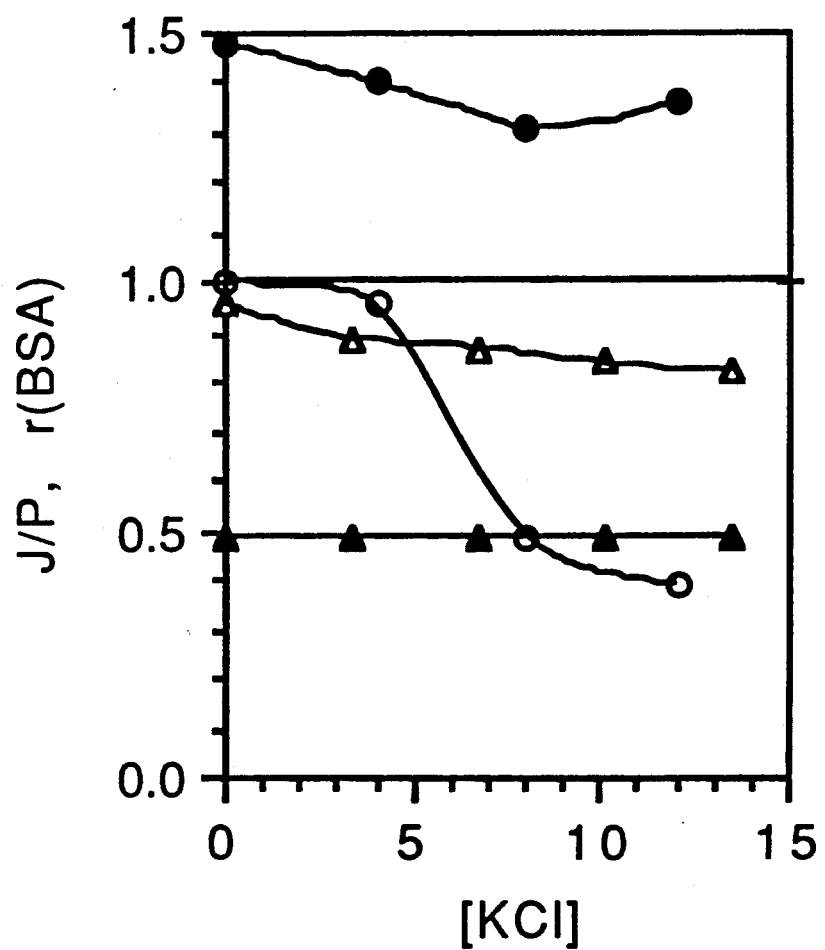

The present invention is directed to a method for applying a crystalline oxide coating to the surfaces of substrates to reduce and control pore size. By an acid catalyzed sol-gel process, such coating is achieved by preparing a homogenous solution, changing the solution to a sol, gelling the sol, converting the gel to an amorphous coating and firing the amorphous coating to achieve a crystalline structure. The reactions involved may be considered in terms of hydrolysis:

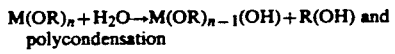

polycondensation

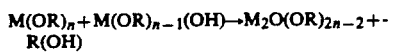

with the overall reaction to complete polymerization being:

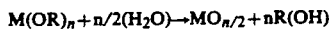

A metal alkoxide starting material such as titanium (IV) isopropoxide may be employed. Other metal alkoxides including zirconium, copper, silicon, yttrium, aluminum alkoxides, mixtures of the alkoxides and the like may be employed such as ethoxides, propoxides and may be employed such as ethoxides, propoxides and butoxides in their various isomeric forms. For the titanium alkoxides, the following generalized reactions are taking place:

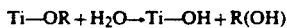

In the preferred case, the reaction starts with the acid catalyzed hydrolysis of one or more alkoxyl groups of a titanium isopropoxide molecule. Water is consumed and alcohol is produced. Two molecules, each containing an OH group polymerize into a dimer by releasing a water molecule resulting in the formation of a —Ti—O—Ti— bond. When the dimer containing OH groups produced by hydrolysis of alkoxyl groups reacts with another hydrolyzed molecule, a trimer with —Ti—O—Ti—O—Ti— bonding is produced.

More particularly, the initial step of the present invention is to prepare a treating solution comprising a partially polymerized metal alkoxide-alcohol sol. The sol is prepared by combining a metal alkoxide, that will form an insoluble hydrous oxide through reaction with water, with an alcohol and with sufficient water and a catalyst, such as hydrochloric acid or nitric acid, to partially polycondense and hydrolyze the alkoxide as described above.

Degree of polymerization may be controlled by assuring that the total water (including water in the acid as well as water that may be absorbed in the alcohol) is less than the stoichiometric level required for complete polymerization. In the case of titanium (IV) isopropoxide, the preferred mole ratio of water:alkoxide ranges from about 0.3 to 1.2:1. Acid catalyst concentration preferably ranges from about 0.004 to 0.020 moles per liter. The alcohol preferably is dry to assist in avoiding too much water in this initial step. The alcohol may be any alcohol in which the metal alkoxide is soluble, preferably a $C_{1-6}$ aliphatic alcohol and more preferably one that is analogous to the alkoxide, that is for example, isopropanol in the case of titanium (IV) isopropoxide.

Metal alkoxide concentration in the treating solution should be low enough to assure proper penetration of the treating solution into the pores of the substrate. Preferably, the concentration should be about 0.03 to 0.5 moles per liter The next step of the process is to contact the substrate to be modified with the treating solution for a sufficient time and under conditions (temperature, pressure and agitation) that assure penetration into the porous surface to a limited depth but insufficient to fully penetrate the porous substrate. Preferably the time is controlled to achieve a penetration of 30 to 100 micrometers.

The optimum time to achieve sufficient, but not too much penetration of the substrate, depends on factors understood by those skilled in the art. For example, the starting substrate, particularly its porosity; the metal alkoxide used and its concentration in the treating solution; the temperature and pressure of application; and the desired penetration will have an effect. One skilled in the art will be able to determine the optimum time through routine experimentation. Typically, with the tubular altered substrate of U.S. Pat. No. 4,888,114 and titanium isopropoxide at the preferred concentration and a penetration of 30 to 100 micrometers at ambient conditions (room temperature and atmospheric pressure), the time should be less than 5 minutes, preferably 2 to 3 minutes. The time will be shorter if pressure is slightly higher than atmospheric.

While the process of the present invention preferably involves modifying a dry altered substrate produced by the process of U.S. Pat. No. 4,888,114, which is incorporated herein by reference, it can also be applied to substrates made of other materials such as unaltered stainless steel substrates such as those that form the starting substrate for U.S. Pat. No. 4,888,114. The dry substrate is preferably in tubular form, but can be of any geometry useful for filtration operations.

After the desired penetration is achieved, the treating solution is drained.

Sufficient water, preferably as a vapor and more preferably as moist air or moist nitrogen, is then added to further polymerize the partially polymerized metal alkoxide to form a loosely structured, polymerized network which is a gel. Generally, in a gel, all species are interconnected but lack the long-range periodicity which is characteristic of crystalline materials. Preferably, the temperature employed in this step and the time of the step should be sufficient to vaporize the volatile alcohol solvent (60° C. at atmospheric pressure for about 10 minutes should be sufficient).

The gel-impregnated substrate then is heated for a sufficient time at a high-enough temperature to complete vaporization of the solvent of the starting solution, to remove residual OR groups, and to allow the metal oxide species to rearrange onto a highly ordered crystalline lattice network. Heating in the presence of air to a temperature of about 400° C. to 450° C. for about 30 to 60 minutes at atmospheric pressure is preferred. Higher temperatures can be used but, in the case of a stainless steel substrate, an inert gas may be required to avoid damage to the stainless steel.

Multiple coatings may be made to further modify pore size. Preferably, the substrate is contacted with the partially polymerized metal alkoxide sol after the prior coating has been substantially crystallized in the final step described above. It may be applied after the water vapor is added to form a gel, but, in this case, the gel-impregnated substrate should be dried prior to the addition of the subsequent coating.

This treatment has an effect on the tubes, obvious from the change in the water permeability expressed as gallons per foot of substrate per day per pound per square inch pressure above the pressure of the filtrate (gfd/psi). The water permeability of the original altered substrates typically is about 20 to 30 gfd/psi, whereas that of the treated tubes is in the range of 1 to 10 gfd/psi. The final permeabilities can be controlled to desired values by varying conditions. The treated tubes also have different selectivities in ultrafiltration separations, and modified characteristics as supports for formed-in-place membranes.

By limiting the time of contact with an altered substrate tube, for example, the isopropyl alcohol treating solution of titanium isopropoxide is not thought to leave material very deeply in the tube. If the time is increased from say three minutes to fifteen, SEM examination of broken tubes indicates new material, presumably hydrous Ti(IV) oxide from contact of solution with moisture in air, at the outer surface of the tubes. This is not seen with contacts of short times. The initial layer from the solution is comprised of titanium of a low degree of hydrolysis, because of the water in the treating solution, in the presence of an acid catalyst, is limited to less than stoichiometric. Consequently, particulates of hydrous oxide are not formed, unlike what is usual in conventional sol-gel processing. Draining the coating solution after contact prevents formation of thick layers, which would crack in the heating step. The passage of moist gas completes the hydrolysis of the titanium alcoholate and facilitates the hydrolytic polymerization of the oxide. The reaction to amorphous oxide is completed by heating. If carried out at a high enough temperature for a sufficient time, the oxide is at least partially converted from amorphous to crystalline phase.

The end result is indicated by SEM to be a coating of new titanium oxide on the rutile particles of the altered substrate, rather than the formation of ne particles or a continuous gel membrane layer at the interface. The pores are consequently narrowed, and the permeability and separation characteristics modified.

The decrease in permeability can be enhanced by increasing concentration of the alkoxide and increasing the number of cycles of contacts. The stability of the modification is influenced by the temperature and time of the heat treatment.

EXAMPLES

EXAMPLE 1

The process of formation and stabilization of modified altered substrate is illustrated in this example. For comparison, a 0.625 inch diameter, 24 inches long, altered substrate stainless steel tube made in accord with the teachings of U.S. Pat. No. 4,888,114 using titanium dioxide was acid washed with nitric acid overnight at a pH of 1.5 and was then dried. The water point of this acid-washed altered substrate indicated a permeability of 10.5 gfd/psi at 25° C.

In preparing a treating solution in accordance with the present invention, selected amount of water and acid catalyst were added to a beaker containing 2-isopropanol and thoroughly mixed for five minutes to obtain the desired concentration of each component. The beaker was covered before and after acid addition to exclude water. After mixing, a predetermined amount of titanium (IV) isopropoxide (TIP), obtained from Aldrich, was added to the solution and was stirred in the covered beaker for one hour. Thereafter, the covered solution was stored in a dry box until used.

In this example, the TIP treating solution made by the above method contained 0.5 moles per liter titanium isopropoxide, 0.008 moles per liter nitric acid (100% basis) and 0.5 moles per liter water in isopropanol.

A single TIP application was made by adding about 200 milliliters of the treating solution to the dried altered substrate tube used above for comparison. Gentle agitation was applied by tilting the tube back and forth for several minutes so as to fully coat the inside of the tube. The treating solution was then fully drained and a moist nitrogen gas that had bubbled through 5% sodium chloride solution at ambient temperature was passed through the tube for 30 minutes. The tube was then heated in air at 250° C. for one hour. The water point measured indicated a reduced permeability of 4.4 gfd/psi at 25° C.

To test the stability to standard cleaning procedures, the tube was exposed to 2.4 g/liter of hydrogen peroxide in 0.4 molar sodium hydroxide for two hours, then to 0.1 molar nitric acid for fifteen minutes. The water point then measured indicated an increased permeability of 8.1 gfd/psi at 25° C., indicating that the treatment was not fully stable.

A second TIP application made as above brought permeability to 2.1 gfd/psi. The standard cleaning procedure resulted in a permeability of 7.3 gfd/psi. A firing at 400° C. for thirty minutes brought permeability to 13.8 gfd/psi.

In a third TIP exposure, the heating step was carried out at 400° C., instead of 250° C. In this case, permeability was reduced to 3.6 gfd/psi at 25° C., but, after the cleaning procedure, the permeability was 3.1 gfd/psi. This shows that stability is increased by carrying out the heating step at 400° C., rather than 250° C.

A fourth TIP application, per the same procedure, followed by heat treatment for 30 minutes at 400° C., further reduced the permeability to 1.3 gfd/psi. This illustrates control of final permeability by successive TIP cycles. After the cleaning procedure this time, water permeability was 2.0 gfd/psi, perhaps an indication that the half-hour exposure at 400° C. was not long enough to completely stabilize the addition.

EXAMPLE 2

Effect of concentration of TIP on permeability after treatment is illustrated in this example. Two test altered substrates were treated essentially by the procedure described in Example 1, with the difference that for one of the tubes, the concentration of TIP was 0.1 molar (M) rather than 0.5M as in Example 1. The water concentration was at a ratio of 1 mole water/mole Ti(IV) in both cases. The results are summarized in Table I:

TABLE I

| TIP concentration (M) | Permeability after cycle | | |
|---|---|---|---|
| | None | 1 | 2 |
| 0.1 | 14.2 | 7.8 | 3.4 |
| 0.5 | 16.5 | 3.9 | 0.5 |

The example indicates the control of final permeability by concentration of TIP in the treating solution and by number of cycles of exposure to it.

EXAMPLE 3

Effect of TIP treatment on separation by porous tube without membrane is illustrated in this example. An altered substrate after four cycles of treatment by 0.1M TIP solutions had water permeability of 6.9 gfd/psi, compared to 37 for the tube before treatment. It was then tested for rejection of bovine serum albumin (BSA), molecular weight 68,000 at pH 8 (above the isoelectric point). The initial rejection was 55%. Typically, untreated altered substrates reject less than 20% under these conditions. Addition of 0.012 molar potassium chloride (KCl) reduced rejection only to 45%, an exceptionally high rejection for this species at this ionic strength.

EXAMPLE 4

Effect of TIP treatment on properties of membrane formed in place on support is illustrated in this example.

FIG. 1 compares rejection and permeability of an altered substrate and a TIP treated altered substrate on which a calcium alginate membrane had been formed. The solute was BSA (1 gram/liter), tested at several different KCl concentrations. Membrane permeability (J/P, flux in gfd/psi) and rejection of bovine serum albumin, r(BSA), are plotted versus concentration of KCl in mM units. The open circles for r(BSA) and the solid circles for J/P pertain to data obtained using an altered substrate. The open triangles for r(BSA) and the solid triangles for J/P pertain to data obtained using a TIP treated altered substrate.

The rejection by the membrane on the altered substrate dropped sharply from essentially complete removal at about 0.005 molar KCl, whereas the membrane on the TIP-treated tube decreased only slightly. The permeability of the membrane on the treated tube was about half that of the untreated.

EXAMPLE 5

Stability of TIP-treated support permeability after successive formation and removal of formed-in-place membranes is illustrated in this example. Table II below illustrates separation properties and permeabilities of a series of membranes (silicate and sodium alginate (SAM) and calcium alginate (CAM) membranes) formed in a succession of tests on a single fired TIP-treated altered substrate (FASTIP). The calcium algenate membranes were formed by different procedures so as to provide different water permeability after forming the membrane in gfd/psi at 37° C. (0.90, 0.73, and 0.62). The FASTIP used was prepared essentially by the procedure described in Example 1.

The membranes were formed in place using procedures known in the art. They were stripped between tests by standard cleaning procedures. The standard stripping procedure consists of the following steps:

(1) Fill the system with water, circulate for about 5 minutes and drain. Repeat at least twice.

(2) Fill the system with a 0.01M NaOH solution, circulate for about 30 minutes and drain.

(3) Fill the system with 0.1% sodium hypochlorite or 0.2% hydrogen peroxide, circulate for about 30 minutes and drain.

(4) Fill the system with water, circulate for about 5 minutes and drain.

(5) Fill the system with 0.01 to 0.1M nitric acid, circulate for about 30 minutes and drain.

(6) Fill with water, circulate for about 5 minutes and drain. Repeat.

Abbreviations used in the table are as follows:

Sub-J/P is the water permeability of the substrate after stripping before a membrane is formed on it in gfd/psi at 37° C.

Mem-J/P is the water permeability after forming the membrane in gfd/psi at 37° C.

U is the rate of circulation through the tube in meters per second (m/s).

J/P is the flux through the membrane in gfd/psi at 37° C.

r(BSA) is the fraction of BSA in the feed that is rejected (1.00 is complete rejection).

Particularly noteworthy is the reproducibility of the water permeabilities just after stripping (Sub-J/P), before forming the next membrane. Values fall in a narrow range, between 5.2 gfd/psi and 6.0 gfd/psi.

TABLE II
FASTIP DATA

| SUB-J/P | Membrane | MEM-J/P | pH | KCl (mM) | U (m/s) | J/P (gfd/psi) | r(BSA) |
|---|---|---|---|---|---|---|---|
| 5.2 | None | 5.20 | 8.0 | 0.0 | 1.52 | 1.36 | 0.55 |
| | | | 8.0 | 0.0 | 0.50 | 0.94 | 0.52 |
| | | | 8.0 | 0.0 | 1.55 | 0.86 | 0.84 |
| | | | 8.0 | 12.0 | 1.55 | 0.70 | 0.45 |
| 5.2 | Silicate | 4.70 | 7.8 | 0.0 | 1.57 | 1.31 | 0.60 |
| | | | 7.8 | 0.0 | 0.51 | 1.15 | 0.48 |
| | | | 7.8 | 0.0 | 1.51 | 1.07 | 0.83 |
| | | | 7.8 | 12.0 | 1.51 | 0.06 | 0.43 |
| 5.5 | SAM | 1.81 | 8.0 | 0.0 | 1.54 | 1.07 | 0.92 |
| | | | 8.0 | 0.0 | 0.52 | 0.94 | 0.77 |
| | | | 8.0 | 0.0 | 1.54 | 0.86 | 0.95 |
| | | | 8.0 | 12.0 | 1.54 | 0.70 | 0.47 |
| 6.0 | CAM | 0.90 | 7.8 | 0.0 | 1.42 | 0.74 | 1.00 |
| | | | 7.8 | 0.0 | 0.52 | 0.78 | 1.00 |
| | | | 7.8 | 0.0 | 1.49 | 0.74 | 1.00 |
| | | | 7.8 | 12.0 | 1.49 | 0.81 | 0.89 |
| | | | 7.8 | 12.0 | 0.49 | 0.78 | 0.73 |
| 5.4 | CAM | 0.73 | 7.8 | 0.0 | 1.43 | 0.49 | 0.96 |
| | | | 7.8 | 3.4 | 1.43 | 0.49 | 0.89 |
| | | | 7.8 | 6.7 | 1.43 | 0.49 | 0.87 |
| | | | 7.8 | 10.1 | 1.43 | 0.49 | 0.84 |
| | | | 7.8 | 13.4 | 1.43 | 0.49 | 0.82 |
| 5.7 | CAM | 0.62 | 7.7 | 0.0 | 1.57 | 0.64 | 0.97 |
| | | | 7.7 | 3.4 | 1.57 | 0.60 | 0.94 |
| | | | 7.7 | 6.7 | 1.57 | 0.60 | 0.92 |
| | | | 7.7 | 10.1 | 1.57 | 0.60 | 0.88 |
| | | | 7.7 | 13.4 | 1.57 | 0.58 | 0.84 |

EXAMPLE 6

TIP modification of tubes of commercial size is illustrated in this example. Eight 10 ft. long, 0.625 inch ID, altered-substrate stainless-steel tubes were subjected to TIP treatment. The first application was 0.5M TIP and 0.008M acid, water/TIP mole ratio was 1, three minutes exposure, followed by drainage under gravity of ten minutes. The wet-nitrogen treatment was half an hour at room temperature. The curing was 1 hour at 400° C. The second application was identical, except that the TIP and water concentrations were about 0.25M. The permeabilities are summarized in TABLE III.

TABLE III

| Tube | After Cycle | Water permeability gfd/psi, 37° C. |
|---|---|---|
| I | 0 | 7.7 |
| | 1 | 3.6 |
| | 2 | 1.9 |
| II | 0 | 14.6 |
| | 1 | 2.7 |
| | 2 | 2.3 |
| III | 0 | 9.4 |
| | 1 | 3.9 |
| | 2 | 1.4 |
| IV | 0 | 10.6 |
| | 1 | 1.8 |
| | 2 | 1.1 |
| V | 0 | 5.3 |
| | 1 | 1.9 |
| | 2 | 2.3 |
| VI | 0 | 15.7 |
| | 1 | 0.9 |
| | 2 | 0.5 |
| VII | 0 | 27.5 |
| | 1 | 8.4 |
| | 2 | 4.8 |
| VIII | 0 | 4.6 |
| | 1 | 2.3 |
| | 2 | 1.3 |

I claim:

1. A process for reducing the sizes of pores near the surface of a porous filter comprising a sintered stainless steel substrate having incorporated in the surface thereof, fired metal oxide particulates comprising the following consecutive steps:
   (a) contacting the surface with an alcoholic solution contain about 0.03 to about 0.5 moles per liter of an alkoxide of Zr(IV),Al(III) or Ti(IV) which forms a hydrous oxide insoluble in water from 0.3 to 1.2 moles of total water per mole of alkoxide, and a mineral acid as catalyst;
   (b) terminating the contact, by draining away the solution, after sufficient time for penetration of the solution into the porous surface to a limited depth but insufficient to fully penetrate the porous substrate;
   (c) exposing the contacted surface to a moist gas for a time necessary to complete hydrolysis of the metal alkoxide; and then
   (d) curing at a temperature and for a time necessary to stabilize the metal oxide in the pores near the surface.

2. The process of claim 1 in which the metal oxide particulates are titanium oxide.

3. The process of claim 2 in which the alkoxide is an ethoxide, butoxide, propoxide, or isopropoxide.

4. The process of claim 3 in which the alkoxide is titanium tetraisopropoxide.

5. The process of claim 4 in which the alcohol is isopropanol.

6. The process of claim 5 in which total water including water in the mineral acid as well as water absorbed in the alcohol in the solution in step (a) is less than the stoichiometric amount needed for complete polymerization.

7. The process of claim 6 in which the concentration of mineral acid is between 0.004 and 0.02 moles per liter.

8. The process of claim 7 in which the mineral acid is hydrochloric acid or nitric acid.

9. The process of claim 8 in which the porous material is exposed to the solution for between 2 and 5 minutes before drainage.

10. The process of claim 9 in which the curing is at a temperature between 400° C. and 450° C. for about 30 to 60 minutes.

* * * * *